United States Patent
Pasternak (10) Patent No.: US 10,754,766 B2
(45) Date of Patent: Aug. 25, 2020

(54) INDIRECT RESOURCE MANAGEMENT

(71) Applicant: Red Hat Israel, Ltd., Ra'anana (IL)

(72) Inventor: Michael Pasternak, Ariel (IL)

(73) Assignee: Red Hat Israel, Ltd., Ra'anana (IL)

( * ) Notice: Subject to any disclaimer, the term of this patent is extended or adjusted under 35 U.S.C. 154(b) by 79 days.

(21) Appl. No.: 14/221,529

(22) Filed: Mar. 21, 2014

(65) Prior Publication Data

US 2015/0269066 A1  Sep. 24, 2015

(51) Int. Cl.
*G06F 12/02* (2006.01)

(52) U.S. Cl.
CPC ........ *G06F 12/023* (2013.01); *G06F 12/0253* (2013.01)

(58) Field of Classification Search
CPC ............... G06F 12/023; G06F 12/0253; G06F 12/0831; G06F 2212/621; G06F 2212/702
See application file for complete search history.

(56) References Cited

U.S. PATENT DOCUMENTS

| | | | | |
|---|---|---|---|---|
| 5,655,101 | A * | 8/1997 | O'Farrell | G06F 9/465 709/217 |
| 6,658,652 | B1 * | 12/2003 | Alexander, III | G06F 9/5016 707/999.202 |
| 7,454,477 | B2 | 11/2008 | Talluri et al. | |
| 7,814,462 | B2 | 10/2010 | Husbands et al. | |
| 8,312,062 | B1 * | 11/2012 | Spivak | G06F 9/5022 707/813 |
| 8,464,217 | B2 | 7/2013 | Janczewski | |
| 8,478,888 | B2 | 7/2013 | Sangara et al. | |
| 8,504,594 | B2 | 8/2013 | Izumi et al. | |
| 2005/0028140 | A1 * | 2/2005 | Ayachitula | G06F 9/5016 717/116 |
| 2007/0027942 | A1 * | 2/2007 | Trotter | G06F 11/0718 |
| 2007/0283117 | A1 * | 12/2007 | Krishnaswamy | G06F 12/0261 711/163 |
| 2008/0294936 | A1 * | 11/2008 | Hogstrom | G06F 11/366 714/6.13 |
| 2012/0197944 | A1 | 8/2012 | Foti | |
| 2013/0054869 | A1 * | 2/2013 | Tolia | G06F 12/0871 711/102 |

(Continued)

FOREIGN PATENT DOCUMENTS

JP  2005100402 A  4/2005

OTHER PUBLICATIONS

Basanta-Val et al., "No-Heap Remote Objects for Distributed Real-Time Java" Journal of ACM Transactions on Embedded Computing Systems (TECS), Volune 10, Issue 1, Article 7, Aug. 2010, http://dl.acm.org/citation.cfm?id=1814546.

(Continued)

*Primary Examiner* — Baboucarr Faal
*Assistant Examiner* — Jane Wei
(74) *Attorney, Agent, or Firm* — Haynes and Boone LLP (57) ABSTRACT

A method for memory management includes allocating an available block of memory for use by a first object, determining that the block of memory includes at least a portion of a second object, the second object no longer being used by an application associated with the second object, determining that the second object utilized at least one resource that was not shutdown, releasing the at least one resource, and writing to the block of memory with the first object.

19 Claims, 6 Drawing Sheets

(56) References Cited

U.S. PATENT DOCUMENTS

2013/0054925 A1* 2/2013 Hsia .................. G06F 11/3604
711/170
2013/0311741 A1* 11/2013 Tene .................. G06F 12/0253
711/170

OTHER PUBLICATIONS

Dillig et al., "The Closer: Automating Resource Management in Java" Computer Science Department Stanford University; IBM T.J. Watson Research Center, USA, Jun. 7-8, 2008, http://www.cs.wm.edu/~idillig/ismm107-dillig.pdf.

Adl-Tabatabi et al. "Compiler and Runtime Support for Efficient Software Transactional Memory", Intel Labs Santa Clara; Intel China Research Center, Beijing, China, Jun. 10-16, 2006, http://www.cs.cmu.edu/afs/cs.cmu.edu/Web/People/745/papers/car-trans-2007.pdf.

"Code Review" ovirt-engine-sdk.git, http://gerrit.ovirt.org/gitweb?p=ovirt-engine-sdk.git;a=tree;f=src/ovirtsdk;h=8c801f3e38b99aafce74946ab4b5a413cb401faf;hb=refs/heads/master, Jul. 2013.

\* cited by examiner

INDIRECT RESOURCE MANAGEMENT

BACKGROUND

The present disclosure relates generally to memory management, and more particularly to methods and systems for releasing resources associated with objects stored in memory.

A computing system regularly uses memory management systems to manage the various memory hardware associated with the system. Memory management is the process of managing and coordinating computer memory. This includes assigning blocks of memory to various programs running on the computing system. The memory management system is designed to perform such tasks in a manner so as to optimize system performance.

The memory management system includes hardware, components of an operating system, and various applications. The hardware involved in memory management includes devices that physically store data. Such devices include (random access memory) RAM chips, memory caches, and SSDs (solid-state drives).

In the operating system, memory management involves the allocation, as well as reallocation, of specific memory blocks to individual programs. The allocation process is ongoing as the demands of different programs change. At the application level, memory management ensures the availability of adequate memory for the objects and data structures of each running program at all times. Application memory management may include tasks such as allocation and recycling.

Memory management systems seek to avoid an issue referred to as memory leakage. Memory leakage occurs when objects or data structures that are no longer being used are not made available for use by other objects. Specifically, the memory management system is not properly notified that the memory blocks occupied by the dead objects are available for reuse by other objects.

To address this issue, programmers may manually program memory deallocation functions into the applications or use destructors. Such functions will manually deallocate memory used by objects when those objects are no longer needed. Additionally, garbage collection functions, which may be part of the memory management system, may regularly search the memory pool for dead objects and free the memory associated with those dead objects.

But, sometimes those dead objects reference other resources, including remote resources. While such resources may be shutdown manually by the programmer, a programmer may forget to write the code in a manner to appropriately shutdown those resources. This can lead to a waste of resources and a less efficient computing system. Thus, it is desirable to have methods and systems for handling this issue.

SUMMARY

A method for memory management, the method performed by a computing system, the method comprising allocating an available block of memory for use by a first object, determining that the block of memory includes at least a portion of a second object, the second object no longer being used by an application associated with the second object, determining that the second object utilized at least one resource that was not shutdown, releasing the at least one resource, and writing to the block of memory with the first object.

According to one example, a method performed by a computing system, the method comprising monitoring a memory space, determining that an available memory block within the memory space is being allocated for a first object and currently stores at least a portion of a second object, determining that the second object is associated with a data store of remote object descriptors, the descriptors not being released, and releasing the resource.

According to one example, a computing system includes a processor and a memory comprising computer readable instructions that when executed by the processor, cause the system to monitor a memory space within the memory, determine that a first object previously occupied a block of memory within the memory space, determine that the first object is associated with a local cache of remote object descriptors, release the at least one resource, and overwrite the block of memory with a second object.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, sometimes dead objects may be associated with a resource that has not been properly closed. Such resources may include other objects, or network sockets. Even if an object stored in memory is no longer needed and the memory where the object is stored is deallocated, the object will still exist in memory. Particularly, if a garbage collector function deallocates the memory object, the object will still be physically stored in the physical memory space. In other words, the object is not actually erased from memory. Rather, the memory management system is informed that the memory block is available for other objects. When a new object is to be stored at the memory block that was previously occupied by an old object the memory management system simply overwrites the old object with the new object.

According to principles described herein, the memory management system, or other component can look at the block of memory on which a new object is to be stored. If the memory block is currently storing a dead object, then that dead object is first examined to determine if it had utilized any resources. If so, it may be the case that these resources were not shutdown properly. In any event, the memory management system may release any resources associated with the dead object. Thus, if a programmer forgot to write the code to cause the resource to be shut down or released, the memory management system can perform that process. Use of such methods and systems reduces the amount of resources being unnecessarily tied up. Thus, more resources are made available for other processes. This allows for a system that is more efficient overall.

Figure 1:
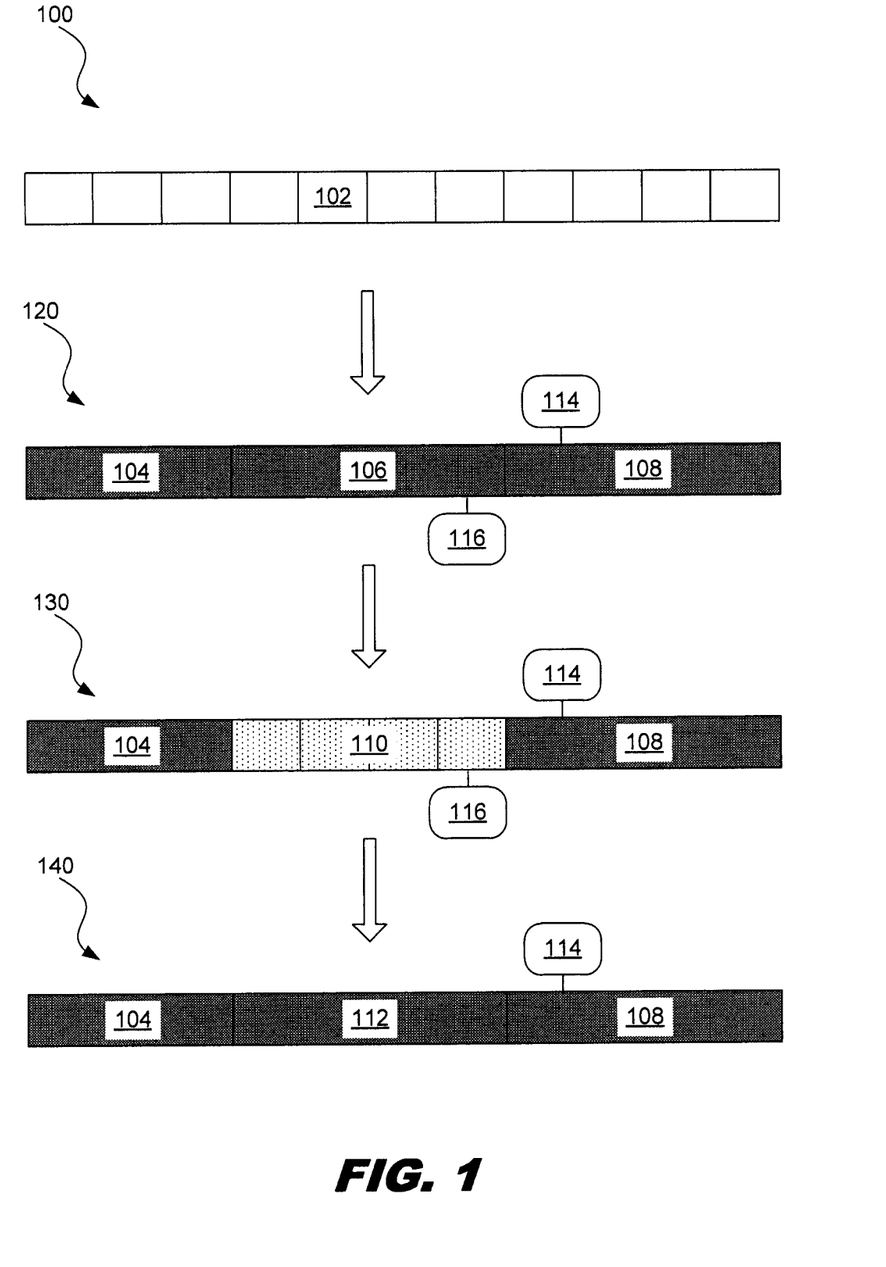
FIG. 1 is a diagram showing an illustrative process for automatic releasing of resources, according to one example of principles described herein.

FIG. 1 is a diagram showing an illustrative process for automatic releasing of resources. FIG. 1 illustrates a memory space 100 at several steps during runtime of various applications. In one example, the memory space 100 may be part of a volatile memory store such as a Random Access Memory (RAM). Volatile types of memory lose the data stored thereon when power is no longer supplied to the memory chip.

A memory space 100 is typically logically divided into memory blocks. Each memory block is a fixed size. The memory blocks 102 may store various objects and data structures. In some examples, an object or data structure may take up several memory blocks. In some cases, an object may be small enough to fit into a single memory block.

An object may refer to a variable, function, or data structure. In some cases, an object may refer to an instantiation of a class. A class is a defined data type that may include constants, variables, and functions for operating with those constants, variables, or inputs to a class.

According to the present example, at step 120, the memory blocks 102 are filled with objects 104, 106, 108. In some cases, some objects 106, 108 may utilize other resources 114, 116. Resources may include a wide variety of computing resources including both hardware, software (machine readable instructions), and virtual resources. For example, resources may include memory space, processor resources, random access memory, virtual memory, hard disk space, network throughput, electrical power, input/output operations, and external devices (e.g., universal serial bus (USB) devices).

In one example, resources 114 and 116 comprise a data store of descriptors that were acquired by an object during the lifetime of that object. Such descriptors may be stored in a local cache. The descriptors may be remote object descriptors. A descriptor is a structure containing information that describes data. Thus, a remote object descriptor describes a remote object. The descriptor might inform an application how to interact with a particular remote object. In some cases, such descriptors may be related to an object in a way that is not detectable by standard memory management tools.

In the present example, object 106 is associated with resource 116. Object 108 is associated with resource 114. The original source code of the program that created the objects 106, 108 typically may, open, or access the resources 114, 116 in an appropriate manner. The source code should also define how to release those resources. For example, various methods such as shutdown( ) or close( ) may be used to release resources used by an object. But, sometimes a programmer may forget to add these functions to the source code. Thus, the resources may never get released appropriately.

In some examples, the resources 114, 116 may be associated with the current application or operating system function being executed by the computing system. But, the current application or operating system function may not manage those resources. For example, the resources may be associated with remote objects.

At step 130, object 106 is no longer needed by the application that created that application. Thus, the object 106 is considered a dead object. Typically, the memory management system is made aware that an object is no longer needed. This may be done in a variety of manners. For example, the source code of the program that created the object 106 may have manually deallocated the memory. In some examples, the programming language in which the source code is written may have an automatic garbage collection function. Such languages include Java. In some examples, garbage collection functions that are separate from the application that created the object 106. The garbage collection function may find that there are no references to a particular object, indicating that the object cannot be accessed by a program. It can then be assumed that the object is "garbage" and the space occupied by the object can be made available for other objects.

After the memory management system is made aware that the object 106 is no longer needed, the memory space 110 where the object used to be is now available for use by another object. Memory systems typically do not delete the data stored within memory space that is made available. Rather, the memory management system is made aware that the memory is available and then the memory space is overwritten when a new object is placed within the memory space.

According to methods and systems embodying principles described herein, before a new object is placed within the memory space 110 where an old object 106 previously resided, it is determined whether the old object is associated with any resources that have not been shut down or released. If there are such resources, such as resource 116, then those resources are released before the memory space 110 is overwritten with a new object 112 as illustrated in step 140. Thus, even if a programmer forgets to manually release resources through the source code, the resources will still be released eventually. This leads to an increase in overall system performance because more resources that would be unnecessarily tied down become available.

In some examples, retrieving the old object 106 can be done by encapsulation by decoration of standard object retrieval. Various methods are used to retrieve objects from memory. Such methods may be modified to retrieve only the references to resources outside the object. Adding this additional feature to the standard retrieval process is referred to as encapsulation by decoration. After the reference to the resource has been retrieved, then the memory block can be overwritten with a new object 112.

Figure 2:
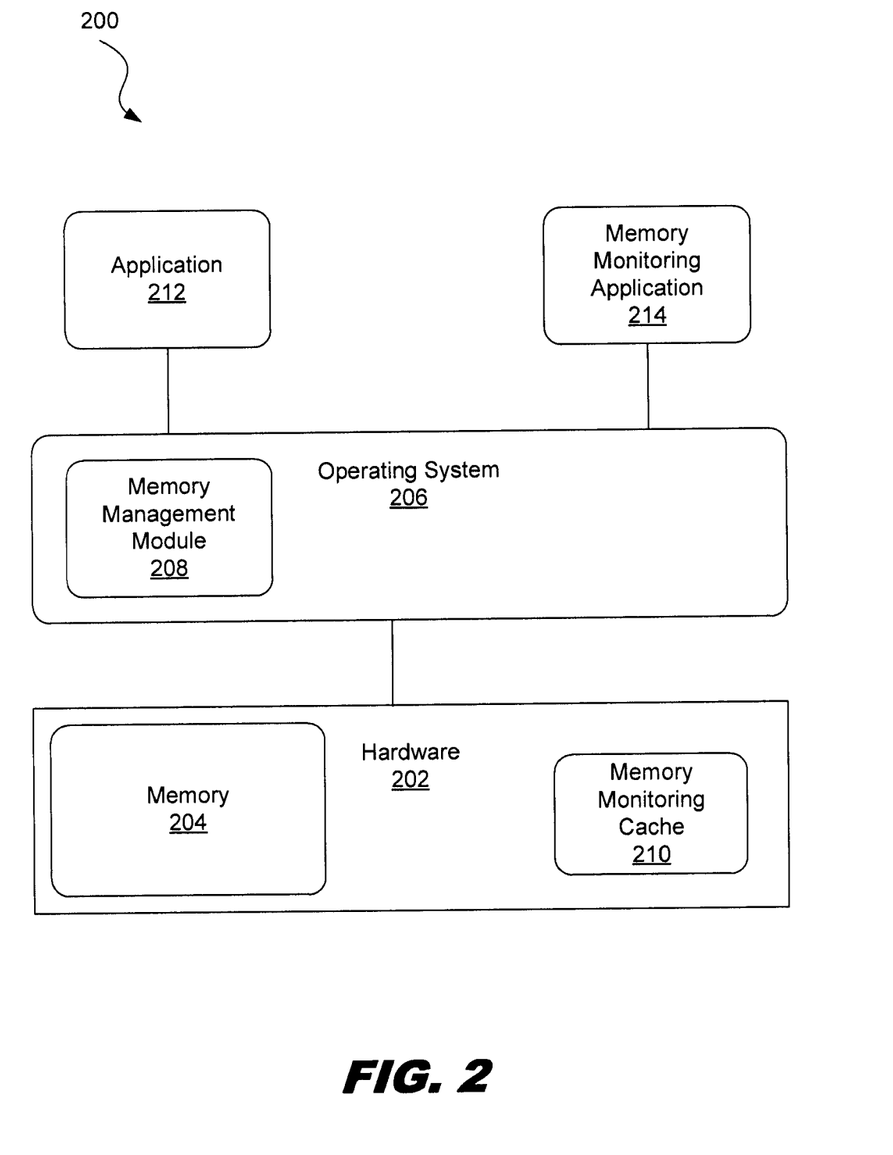
FIG. 2 is a diagram showing an illustrative memory management system capable of automatic releasing of resources, according to one example of principles described herein.

FIG. 2 is a diagram showing an illustrative memory management system 200 capable of automatic releasing of resources. As described above, a memory management system 200 may include several parts, including the hardware 202, operating system 206, and other applications 212. Various features of the memory management system 200 may be used to implement the principles described herein. In some cases, the various features may utilize components outside of a traditional memory management system 200 to implement the principles described herein.

The hardware 202 includes processors and memory 204 and other physical components of a computing system. The memory 204 may include volatile memory such as RAM as well as non-volatile memory such as hard disks. In some cases, memory chips may have dedicated hardware for memory management purposes.

An operating system 206 is a collection of software that manages computer hardware resources and provides various services for applications running on the system. Operating systems may include time-sharing features which allow efficient use of a processor system by multiple applications. The operating system 206 may also act as an intermediary between applications running on the system and the hardware with respect to input/output and memory allocation functions.

Applications are programs that perform various tasks. Applications are often written in source code, which is a human readable language. The source code is then compiled for execution by whatever processor system will be running the application. As the compiled code is executed, the computing system performs the intended functions as defined by the programmer in the source code.

As described above, there may be many ways to implement the principles described herein. In one example, a key/value cache system may be used to monitor memory. This cache system will be referred to as the memory monitoring cache 210. A cache is a component that transparently stores data so that future requests for that data can be provided faster. Key/value pairs are a way of associating data within a data set. Different values are identified by different keys. In the present example, the key can be the physical or virtual memory address where an object is stored. The associated value of a key is the resources opened by that object.

According to one example, as objects are stored in memory 204, the memory monitoring cache 210 stores the address of those objects as a key and the references to resources as the value(s) associated with the key. Thus, when the system 200 attempts to store a new object at a particular memory location, the system 200 can first look at the memory monitoring cache 210. If the address at which the system is attempting to store the new object is within the memory monitoring cache 210, then it is known that there was an old object there that is associated with the resources. The system 200 can then release the resources associated with that old object accordingly.

According to certain illustrative examples, the memory monitoring function can be performed by a discrete application. Thus, a memory monitoring application 214 run by the operating system 206 may be responsible for keeping track of dead objects that reference resources. The memory monitoring application 214 can then determine when those objects are going to be overwritten. The resources referenced by those dead objects can then be released accordingly. The discrete memory monitoring application 214 can be implemented in a variety of source code languages such as Python, Java, or C++.

In some examples, the operating system 206 may be programmed to perform the functions described herein. For example, the operating system 206 may include a memory management module 208 that is capable of monitoring the memory and determining that a dead object that is about to be overwritten is associated with resources that have not been properly shut down. The operating system 206 can then ensure that those resources are released.

In some examples, if the resources associated with an old object are known or temporarily stored elsewhere, the old object can be overwritten before the resources are actually released. Thus, the system does not have to wait for the resources to be released before the old object is overwritten with the new object.

Figure 3:
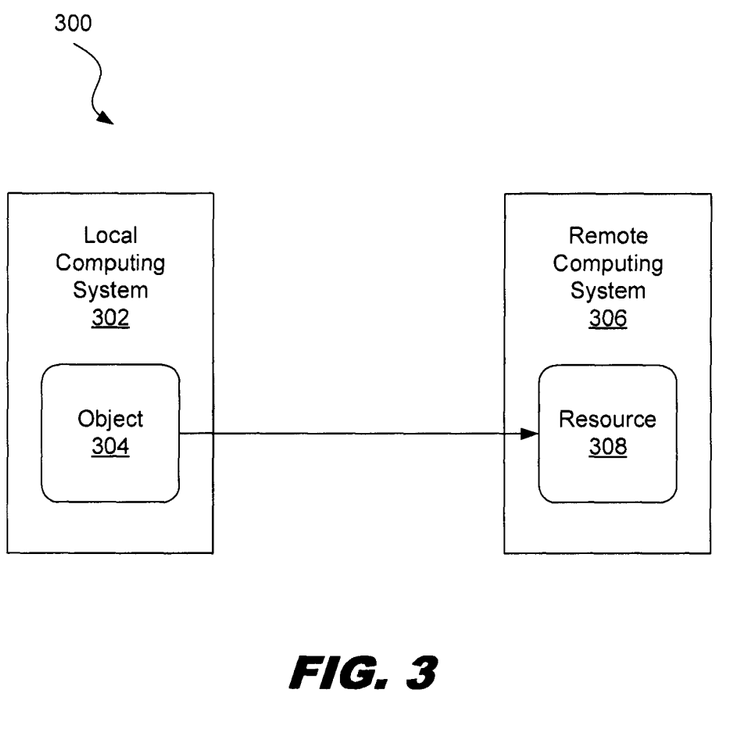
FIG. 3 is a diagram showing an illustrative release of a remote resource, according to one example of principles described herein.

FIG. 3 is a diagram showing an illustrative release of a remote resource. Various applications often utilize resources running on remote systems. Many applications retrieve data and interact with programs running on server systems. Standard garbage collection mechanisms are not typically designed for cleanup on the server side.

According to the present example, the local computing system 302 may have an object 304 stored thereon. The object may be associated with a resource 308 on a remote computing system 306. Such a resource may be a memory location within a memory system of the remote computing system 306. The resource 308 may also be a network socket or processor time of the remote computing system.

Because the remote computing system 306 may be a server that provides services to several client systems, it is desirable to free up resources that are not being used. If a programmer forgets to properly close or shutdown those resources, then they will stay open for a longer period of time on the remote computing system. This prevents those resources from being used by other objects. But, using principles described herein, remote resources are more likely to be freed, thereby increasing the system performance of the remote computing system 306 in addition to the local computing system 302.

Figure 4:
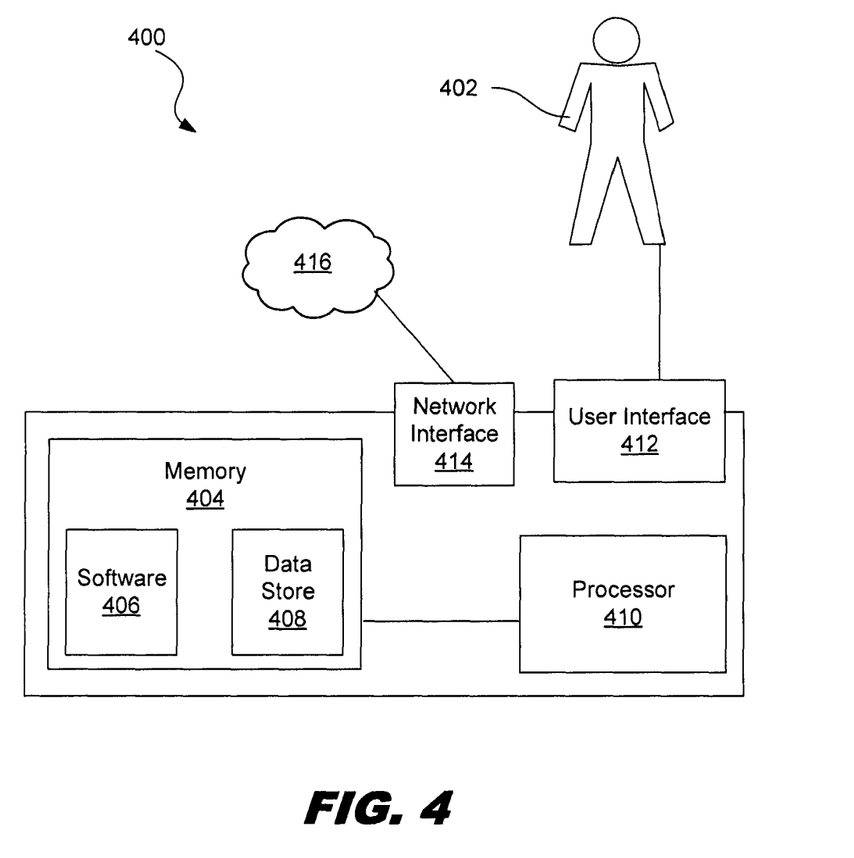
FIG. 4 is a diagram showing an illustrative computing system that may be used to automatically release resources, according to one example of principles described herein.

FIG. 4 is a diagram showing an illustrative computing system that is capable of automatic releasing of resources. According to certain illustrative examples, the computing system 400 includes a memory 404 which may include software 406 and a data store 408. The computing system 400 also includes a processor 410, a network interface 414, and a user interface 412.

The memory 404 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 406 and data in the data store 408.

The computing system 400 also includes a processor 410 for executing the software 406 and using or updating the data 408 stored in memory 404. The software 406 may include an operating system and various other software applications. For example, the software may include a discrete application that monitors memory and releases resources associated with old objects that are no longer being used by the application that created them.

The user interface 412 may include a number of input devices such as a mouse, touchpad, or touchscreen that allow the user 402 to interact with a GUI. The user interface 412 may also include a number of different types of output devices such as a monitor or a touchscreen. The user interface allows the user 402 to interact with the computing system 400.

The network interface 414 may include hardware and software that allows the processing system 400 to communicate with other processing systems over a network 416. The network interface 414 may be designed to communicate with the network 416 through hardwire media such as Ethernet, coaxial, fiber-optic, etc. The network interface 416 may also be designed to communicate with the network 416 using wireless technologies. The network interface may provide the computing system with access to resources of a remote computing system over the network 416. These resources can be released in a manner according to principles described herein.

Figure 5:
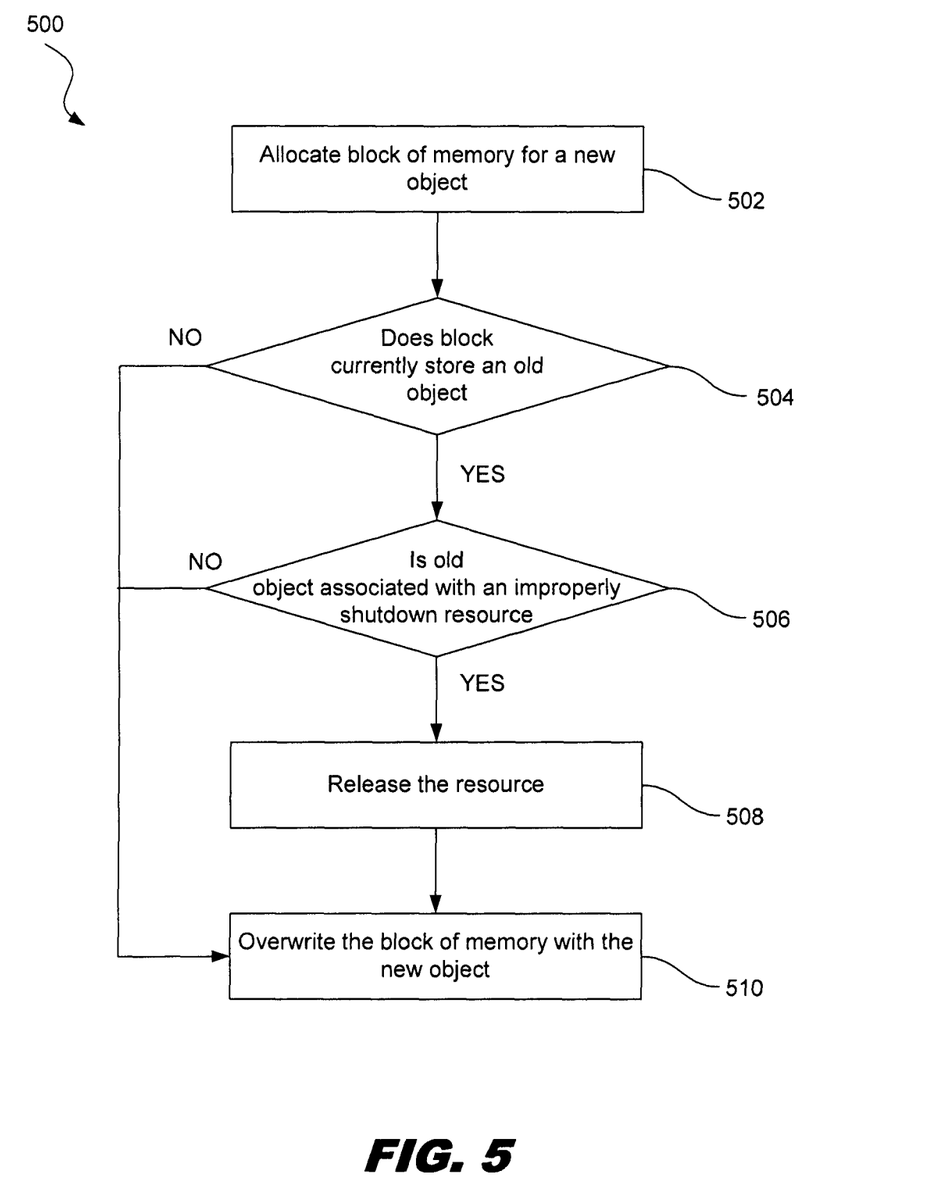
FIG. 5 is a flowchart showing an illustrative method for automatic releasing of resources, according to one example of principles described herein.

FIG. 5 is a flowchart showing an illustrative method for automatic releasing of resources. According to one example, the method 500 includes a step 502 for allocating a block of memory for a new object. This may be done in a variety of ways. For example, the memory management system may allocate blocks of memory for new objects as needed during runtime.

The method 500 continues at step 504 by determining whether the block of memory currently stores an old object. If not, then the method 500 proceeds to step 510 and writes to the block of memory with the new object. But, if an old object is currently stored in that block of memory, then the method 500 proceeds to step 506.

At step 506, it is determined whether the old object stored in memory is associated with a resource that was not properly shutdown. The resource may be a local data store of remote object descriptors. If not, then the method 500 proceeds to step 510 and writes to the block of memory with the new object. But, if the old object is associated with a resource that was not properly shutdown, then the method proceeds to step 508.

At step 508, the resource associated with the old object is released. This frees up the resource for other objects to use. In some examples, it can first be determined whether the resource has already been released. For example, the programmer may have properly included a proper shutdown or close method within the class of which the object is part. Thus, there is no need to release the resource. If, however, it is determined that the resource was not released properly, the resource can be released appropriately at that time.

The method then proceeds to step 510, wherein the block of memory is overwritten with the new object. As described above, the resource does not have to be completely released before the block of memory is overwritten. For example, the system may copy the references to the resources to a temporary location. The old object can then be overwritten. The system may then use the references stored at another location to properly shutdown or release those resources. This allows for smoother operation of the computing system as it does not have to wait for release of resources before performing standard memory writing operations.

Figure 6:
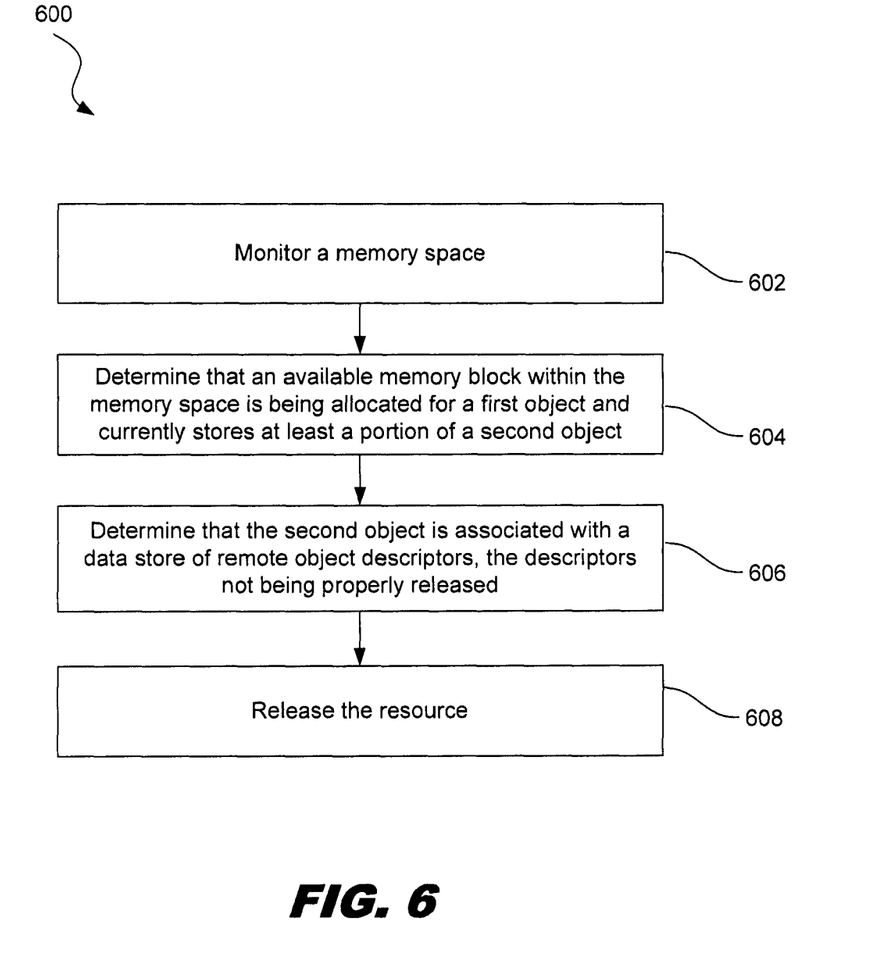
FIG. 6 is a flowchart showing an illustrative method for automatic releasing of resources, according to one example of principles described herein.

FIG. 6 is a flowchart showing an illustrative method for automatic releasing of resources. According to certain illustrative examples, the method 600 includes a step 602 for monitoring a memory space. This may be done in a variety of ways. As described above, a cache system may be used to store references within objects, the references pointing to resources outside the object. Additionally, or alternatively, the operating system or another discrete application may monitor the memory space.

The method 600 further includes a step 604 for determining that an available memory block within the memory space is being allocated for a first object and currently stores at least a portion of a second object. For example, the memory management system may indicate that the memory block is available because the object that used to reside in that memory block is no longer needed by the program that created the object. Additionally, the memory management system is aware of the availability because the memory block has been deallocated, either manually or automatically through a garbage collection function. But, as most memory systems do not delete the contents of memory upon deallocation, the old object is still stored on that space.

The method 600 further includes a step 606 for determining that the second object is associated with a data store of remote object descriptors, the descriptors not being properly released. For example, the old object may have allocated memory space on a remote server in order to accomplish various tasks associated with the object. It may also be that the resource was not released properly. Thus, the resource is being wasted.

The method 600 further includes a step 608 for releasing the resource. Having the reference to the resource, the memory management system may release the resource in an appropriate manner. This may involve using a shutdown function or close function that should have been added to the source code. Thus, the resource is freed for use by other resource consuming components.

Some examples of processing systems described herein may include non-transient, tangible, machine readable media that include executable code that when run by one or more processors (e.g., processor 410) may cause the one or more processors to perform the processes of methods 500 and 600 as described above. Some common forms of machine readable media that may include the processes of methods 500 and 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for memory management, the method performed by a computing system, the method comprising:
   allocating a block of memory for use by a first object, wherein an entirety of the block of memory is available;
   determining that the block of memory includes at least a portion of a second object that was stored in the block of memory before allocating the block of memory for use by the first object, the second object no longer being used by an application associated with the second object;
   determining that the second object utilized at least one resource that was not shutdown, wherein the at least one resource comprises a remote resource on a different computing system, the at least one resource comprising at least one of: a network socket, or processor time;
   releasing the at least one resource in response to determining that the at least one resource was not shutdown; and
   performing a write operation, the write operation comprising writing to the block of memory with the first object to overwrite the second object, and copying at least one reference within the second object to a temporary location, wherein the at least one reference points to the at least one resource outside the second object.

2. The method of claim 1, wherein, the remote resource having been utilized by the second object over a network.

3. The method of claim 1, wherein the block of memory was designated by a memory management system as available.

4. The method of claim 1, wherein the at least one resource comprises a local data store of remote object descriptors.

5. The method of claim 1, further comprising, utilising a key/value cache to monitor memory space in which the block of memory exists.

6. The method of claim 5, wherein the key is a memory address.

7. The method of claim 6, wherein the value is references to resources of an object stored at the memory address.

8. The method of claim 1, wherein determining that the second object utilized at least one resource comprises retrieving the second object through encapsulation by decoration over an object retrieval process.

9. A method performed by a computing system, the method comprising:
monitoring a memory space;
determining that a memory block within the memory space is being allocated for a first object and currently includes at least a portion of a second object that was stored in the memory block before allocating the memory block for the first object, wherein an entirety of the memory block is available;
determining that the second object is associated with a data store of remote object descriptors, the remote object descriptors not being released, wherein the remote object descriptors comprise remote object descriptors on a different computing system;
releasing resources associated with the remote object descriptors in response to determining that the remote object descriptors were not released; and
performing a write operation comprising writing to the memory block with the first object to overwrite the second object, and copying at least one reference of the second object to a temporary location, wherein the at least one reference points to the at least one resource outside the second object.

10. The method of claim 9, further comprising, storing the first object within the memory block after retrieving at least a reference to the remote object descriptors.

11. The method of claim 9, wherein releasing the resources comprises calling one of: a shutdown method and a close method.

12. The method of claim 9, wherein monitoring the memory space is performed by a memory management system.

13. The method of claim 9, wherein monitoring the memory space is performed by a discrete application.

14. The method of claim 9, wherein the memory block is available as a result of a garbage collection function.

15. The method of claim 9, wherein the second object is no longer in use by an application that created the second object.

16. A computing system comprising:
a processor; and
a memory comprising computer readable instructions that when executed by the processor, cause the system to:
monitor a memory space within the memory;
determine that a first object occupied a block of memory within the memory space before the block of memory was allocated for use by a second object, wherein an entirety of the block of memory is available;
determine that the first object references at least one resource that was not shut down, wherein the at least one resource is a remote resource associated with a different system, the at least one resource comprising at least one of: a network socket, or processor time;
release the at least one resource in response to determining that the at least one resource was not shut down; and
performing a write operation to overwrite the available block of memory with a second object, and copy one reference of the first object to a temporary location, wherein the one reference points to the at least one resource outside the first object.

17. The system of claim 16, wherein the computing system is connected to the different system over a network.

18. The system of claim 16, wherein the computer readable instructions further cause the system to utilize a key/value cache to monitor the memory space, wherein the key is a memory address and the value is the content of an object stored at the memory address.

19. The method of claim 9, further comprising, utilizing a key/value cache to monitor the memory space.

* * * * *